(12) United States Patent
Gervais et al.

(10) Patent No.: US 7,940,801 B2
(45) Date of Patent: May 10, 2011

(54) METHOD AND APPARATUS FOR SYNCHRONIZING DIGITAL VIDEO USING A BEACON PACKET

(75) Inventors: John Alan Gervais, Carmel, IN (US); Daniel Thomas Wetzel, Dayton, OH (US)

(73) Assignee: Thomson Licensing, Boulogne Billancourt (FR)

( * ) Notice: Subject to any disclaimer, the term of this patent is extended or adjusted under 35 U.S.C. 154(b) by 1519 days.

(21) Appl. No.: 10/541,764

(22) PCT Filed: Jan. 9, 2004

(86) PCT No.: PCT/US2004/000515
§ 371 (c)(1),
(2), (4) Date: Jul. 11, 2005

(87) PCT Pub. No.: WO2004/064301
PCT Pub. Date: Jul. 29, 2004

(65) Prior Publication Data
US 2006/0062195 A1 Mar. 23, 2006

Related U.S. Application Data

(60) Provisional application No. 60/439,092, filed on Jan. 9, 2003.

(51) Int. Cl.
*H04J 3/06* (2006.01)
(52) U.S. Cl. ......... 370/503; 370/509; 713/400; 725/147

(58) Field of Classification Search .................. 370/345, 370/503, 509; 713/400; 725/147
See application file for complete search history.

(56) References Cited

U.S. PATENT DOCUMENTS

| | | | |
|---|---|---|---|
| 5,751,721 A * | 5/1998 | Bloks | 370/509 |
| 6,493,832 B1 | 12/2002 | Itakura et al. | |
| 7,006,446 B1 * | 2/2006 | Anderson | 370/248 |
| 7,120,092 B2 * | 10/2006 | del Prado Pavon et al. | 368/46 |
| 2002/0049983 A1 * | 4/2002 | Bove et al. | 725/135 |
| 2002/0098852 A1 | 7/2002 | Goren et al. | |
| 2002/0141375 A1 | 10/2002 | Choi | |
| 2003/0002540 A1 * | 1/2003 | Eerenberg et al. | 370/518 |
| 2003/0056136 A1 * | 3/2003 | Aweya et al. | 713/400 |
| 2004/0008661 A1 * | 1/2004 | Myles et al. | 370/350 |
| 2004/0037366 A1 * | 2/2004 | Crawford | 375/295 |
| 2005/0020226 A1 * | 1/2005 | Mohindra | 455/232.1 |
| 2006/0165129 A1 * | 7/2006 | Li et al. | 370/503 |
| 2007/0091934 A1 * | 4/2007 | Myles et al. | 370/503 |

FOREIGN PATENT DOCUMENTS

| | | |
|---|---|---|
| JP | 9-270779 | 10/1997 |
| JP | 2000-332830 | 11/2000 |

OTHER PUBLICATIONS

Search Report Dated Sep. 11, 2004.

* cited by examiner

*Primary Examiner* — Seema S Rao
*Assistant Examiner* — Sai-Ming Chan
(74) *Attorney, Agent, or Firm* — Robert D. Shedd; Paul P. Kiel

(57) ABSTRACT

A WLAN compliant device which comprises a VCX), a MAC, a decoder which outputs video wherein said device compares time stamps to obtain a difference.

5 Claims, 3 Drawing Sheets

METHOD AND APPARATUS FOR SYNCHRONIZING DIGITAL VIDEO USING A BEACON PACKET

This application claims the benefit, under 35 U.S.C. §365 of International Application PCT/US04/00515, filed Jan. 9, 2004, which was published in accordance with PCT Article 21(2) on Jul. 29, 2004 in English and which claims the benefit of U.S. provisional patent application No. 60/439,092, filed Jan. 9, 2003.

FIELD OF THE INVENTION

The invention relates to a method and an apparatus for synchronizing digital transmission using beacon packets, and in particular, using beacon packets utilized in communication between a wireless access point and a wireless station operating in accordance with the IEEE 802.11 or derivative standards.

DESCRIPTION OF RELATED ART

The context of the present invention is the family of wireless local area networks or WLAN specifications developed by a working group at the Institute of Electrical and Electronic Engineers (IEEE). The IEEE 802.11 standards define conventional WLAN access points, which provide access for mobile devices to the WLAN and to other networks, such as hard wired local area networks and global networks, such as the Internet. One such wireless access point may receive input from a settop box as is utilized in conditional access broadcasting.

FIG. 1 illustrates an exemplary digital video and audio system suitable for implementing the present invention. At the head end a multiple video and audio content stream is converted into a digital format (typically in accordance with the MPEG-2 standard) and transmitted via satellite to a receiving dish, or other suitable means, which is attached to a broadcast receiver referred to as a cable set top box or other suitable receiving means such as a Transceiver/multiplexer/demultiplexer or TMD. U.S. Pat. No. 6,510,519, describes a representative system utilizing a headend and a set top box including tuners, de-modulators, decoders, transport de-multiplexers, microprocessors, program memories, video picture memories, MPEG video decoders, displays, and smart cards. Most digital broadcast system data streams are encoded or scrambled for security purposes and once decryption occurs, the system builds a video composite picture in memory, typically in accordance with the MPEG-2 standard, and displays the desired picture with its audio component on a monitor. In addition to descrambling the program, generally, further authorizations are provided to insure that the particular receiver has been enabled to receive a program or a set of programs.

As further illustrated in FIG. 1, the broadcast receiver or TMD or set top box (all hereinafter referred to as a set top box) may be designed and configured to further communicate with a wireless access point, which in the illustrative example provided, receives demultiplexed output including its timing signals so as to synchronize the transmission of the video and audio content.

The IEEE 802.11 standards define a WLAN architecture that is built around the notion of a Basic Service Set or BSS which is regarded as a basic building block. The BSS consists of a group of any number of access point stations that communicate with one another. In each independent BSS, the mobile stations communicate directly with each other. In an infrastructure BSS, all stations in the BSS communicate with the access point and no longer communicate directly with the independent BSS such that all frames are relayed between stations by the access point. The proposed invention may be used in the context of an Infrastructure BSS.

In order to effectively communicate in a network through a wireless connection to a wireless access point the various devices in the WLAN must be synchronized so as to particularly avoid pauses or jumps in the video presented to the display. The program content is typically stored in a forward and store buffer, where it awaits the clock signals that move it into subsystems for audio and video display. If the digital program content, typically a composite video signal, source leads, or transmits digital content signals before the destination has emptied its buffer and presented the video, the destination's forward and store buffer will overflow, causing a loss of video data. Conversely if the digital video destination store and forward buffer empties the buffer before additional data is received, or leads the digital video source, the destination's buffer can underflow leading to pauses, or freezes, in the video presentation. Synchronizing the rate at which the data is transmitted, stored, and consumed with respect to the rate at which it is produced reduces or eliminates these undesirable consequences. It is desirable to provide a method and apparatus for improving the tuning synchronization in a wireless system.

SUMMARY OF THE INVENTION

The invention provides an apparatus and a method for timing synchronization beyond the set top box through the wireless access point to the wireless station which is the final destination of the video data The IEEE 802.11 standards provide for a synchronization feature known as a beacon packet. This packet synchronizes the wireless access point with the receiving station it manages. By using the set top box's Voltage Controlled Crystal Oscillator, or VCXO, clock output as an input to the media access control, typically referred to as a MAC chip or subsystem, of the wireless access point, the timing information in the beacon packet can be adjusted to additionally compensate for variations already detected in the set top box. This beacon packet is then transmitted by the access point to all wireless stations within its basic service set or BSS.

The wireless station's CPU can then use this beacon information to control a local VCXO to adjust the rate at which its MAC chip consumes data from the wireless link. By adjusting the rate of the wireless station, its time base can match the rate at which the video data is produced at the Head End, thereby reducing the risk of buffer underflow/overflow. The result is smoother video stream with less risk of pausing and skipping.

The invention disclosed herein includes a receiver transmitter system comprising: a means for receiving a time stamp indicating the time of a video transmission; a means for determining a relative time difference between the time stamp and a previous time stamp; a means for communicating the relative time difference to a transmitter having as one feature of transmission a time base; and a means for the transmitter to adjust the time base according to the relative time difference. The transmitter in the receiver transmitter system further communicates, to one or more receivers, the adjusted the time base according to the relative time difference. Ultimately, the one or more receivers adjust a time base according to the relative time difference.

The present method utilizes a set top box configured to receive digital packets referred to as AUX from the Head End containing periodically inserted precise timestamps referred to as system clock reference or SCR into the video stream. At the exact time an AUX packet is detected in the set top box, a local VCXO clock is latched. By comparing the time difference between the current and last AUX packet's SCR to that of the current and last value latched in the local clock, adjustments can be made to the VCXO to synchronize the data rate with the Head End. The invention disclosed herein includes a method comprising the steps of: determining a relative time difference between the time stamp and a previous time stamp; communicating the relative time difference to a wireless access point transmitter having as one feature of transmission a time base; adjusting the time base according to the relative time difference received from the set top box; transmitting the adjustment to one or more wireless station receivers wherein each of the wireless station receivers adjust the time base according to the relative time difference. These changes in the rate of the wireless access point beacon and the affect such change has upon the wireless station VCXO have a corresponding effect on the rate at which the video data is consumed and reducing the risk of buffer underflow/overflow.

BRIEF DESCRIPTION OF THE DRAWINGS

The invention is described with the following detailed description in connection with the accompanying drawings.

DETAILED DESCRIPTION OF THE INVENTION

In the figures to be discussed the circuits and associated blocks and arrows represent functions of the process according to the present invention which may be implemented as electrical circuits, and associated wires or data busses, which transport electrical signals, and/or software modules. Alternatively, one or more associated arrows may represent communication (e.g., data flow) between software routines, particularly when the present method or apparatus of the present invention is implemented as a digital process.

Figure 1:
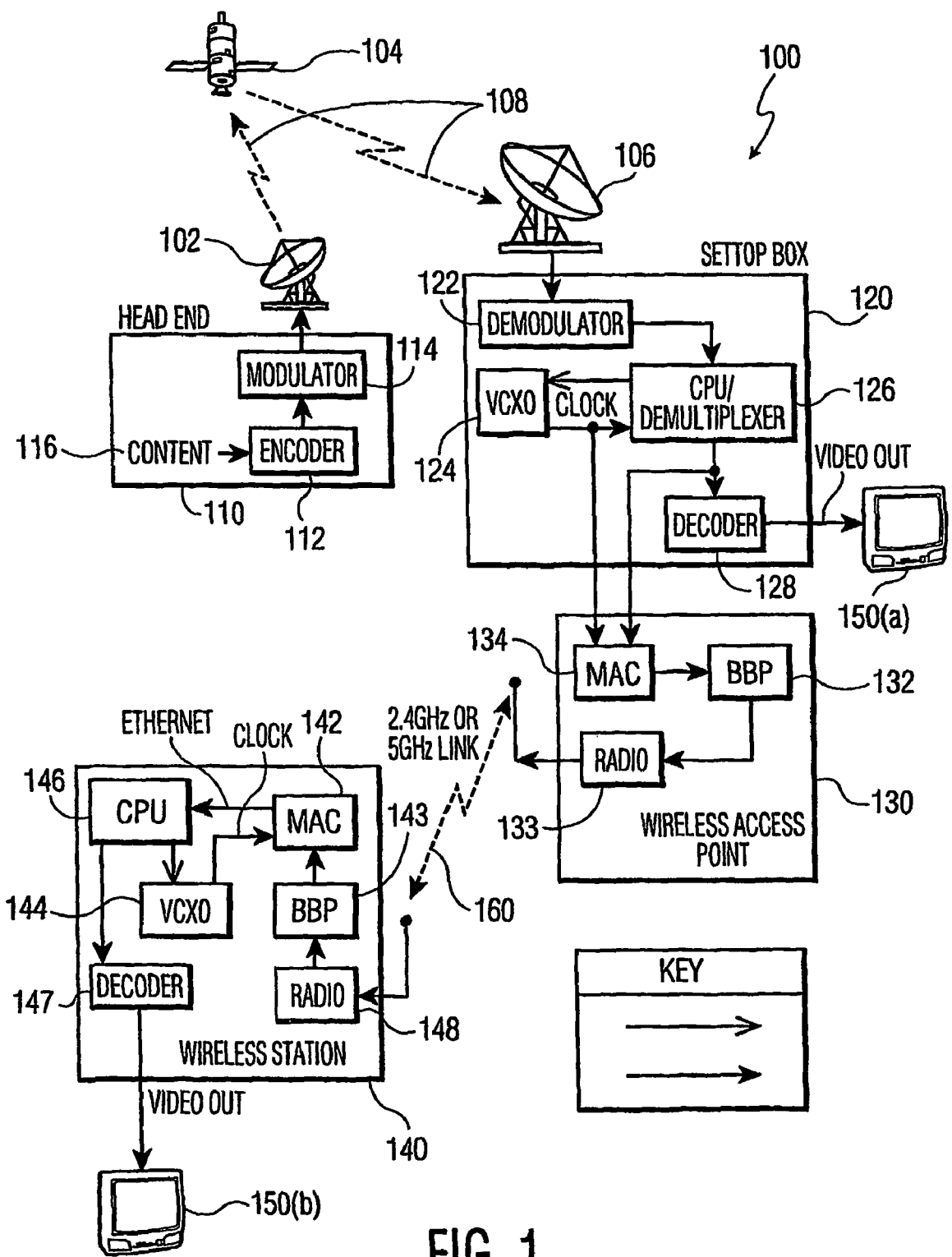
FIG. 1 is a block diagram of a conditional access system.

The arrangement shown in FIG. 1 provides an overview of a service provider 100 system that supplies video programming, for example television programming according to a digital television standard. All digital broadcast system data streams contain video, audio, timing information and are encoded or scrambled for security purposes to insure only authorized subscribers can view the programs transmitted.

In a subscriber based digital broadcast system, the customer receives in addition to the composite video and audio information, various administrative and control messages such as entitlement control messages, which contains an exploitation key necessary to decrypt the encrypted control word necessary to decode a descrambling key so as to permit the decryption and assembling of the digital video and audio data. Once decryption occurs, the system builds a video composite picture in memory, typically in accordance with the MPEG-2 standard, and displays the desired picture on a display.

In accordance with FIG. 1, a head end 110 digitally formats video and audio content 116 in an encoder 112 which are modulated by modulator 114 so as to be transmitted from a transmitter 102 via satellite 104 to a receiving dish 106 located at a receiving end for television service to conditional access customers.

The receiving end typically is a digital set top box 120 which electronically connects to the receiving dish 106. The set top box contains a demodulator 122 that demodulates the composite video and audio information, various administrative and control messages and outputs the demodulated signal to a central processing unit or CPU/demultiplexer 126 that processes the many packetized streams by routing select packets to various control, data and status subsystems. For example, typically the selected packetized video and audio stream is sent to a decoder 128 for translation into a format suitable for output to a television 150a, such as NTSC, PAL or SECAM.

A VCXO 124 synchronizes the time base that provides a clock to the CPU/demultiplexer 126 which adjusts the time base for variations in timing between the video source at the head end 110 and the set top box 120. At the head end digital packets containing precise timestamps 118 are periodically inserted into the content 116 prior to transmission 108. These timestamps are called the System Clock Reference (SCR).

The present invention is directed to a broadcast 100 system that utilizes components to present a video and audio data stream to an IEEE 802.11 compliant architecture, that is a wireless local area access device as indicated by transmission 160 utilizing a wireless access point 130 and one or more wireless stations 140. As such an IEEE 802.11 complaint system is comprised of several components, each of which contains a Medium Access Control or MAC 134, 142; and a Base Band Process or BBP 132, 143 responsible for at least Forward Error Correction, or FEC, to validate that the packet has not been corrupted by noise and to fix it if possible. BBP 132, 143, and radio receiver/transmitters 138, 140 as well as services to provide station mobility transparent to the higher layers of the network stack. However, a station is any device that contains the functionality of the IEEE 802.11 protocols, that being MAC and Physical Layer or PHY, and a connection to the wireless media such as wireless station 140. Typically, the IEEE 802.11 functions are implemented in the hardware and software of a network interface card (unshown). By way of example, the wireless station 130 connects to other wireless medium such as wireless station 140.

A wireless complaint device may be representative of wireless station 140, which may in turn depict a laptop personal computer, a handheld device, or may be representative of an access point 130 which manages wireless stations, such as wireless station 140. Therefore, stations may be mobile, portable, or stationary and all stations that are IEEE 802.11 compliant provide for services of authentication, de-authentication, privacy, and data delivery.

The invention provides an apparatus and a method for timing synchronization beyond the set top box through the wireless access point 130 to the wireless station 140, which is the destination of the video data which is decoded in decoder 147 and displayed on device 150 (b). The IEEE 802.11 standards incorporate a synchronization feature referred to as a beacon packet. This packet is used to synchronize the wireless access point 130 data streams with one or more stations it is managing, such as wireless station 140. By using the set top box's 120 VCXO 124 clock output as an input to the wireless access control 130 input, shown as a MAC chip 134 of the wireless access point 130, the timing information in the beacon packet can be adjusted to additionally compensate for variations already detected in the set top box 120. This beacon packet is then transmitted via radio transmitter 138 of wireless access point 130 to all wireless stations capable and configured to receive, such as wireless station 140 and corresponding radio receiver 148, within its basic service set.

The wireless station's 140 CPU 146 can then use this beacon information to control a local VCXO 144 to adjust the rate at which its MAC chip 142 consumes data from the wireless link 160. By adjusting the beacon information by the relative time difference determined by the set top box 120, the wireless station 140 can match its time base to the rate at which the video data is produced at the head end, thereby reducing the risk of buffer underflow/overflow. The result is smoother video with less risk of pausing and skipping.

Figure 2:
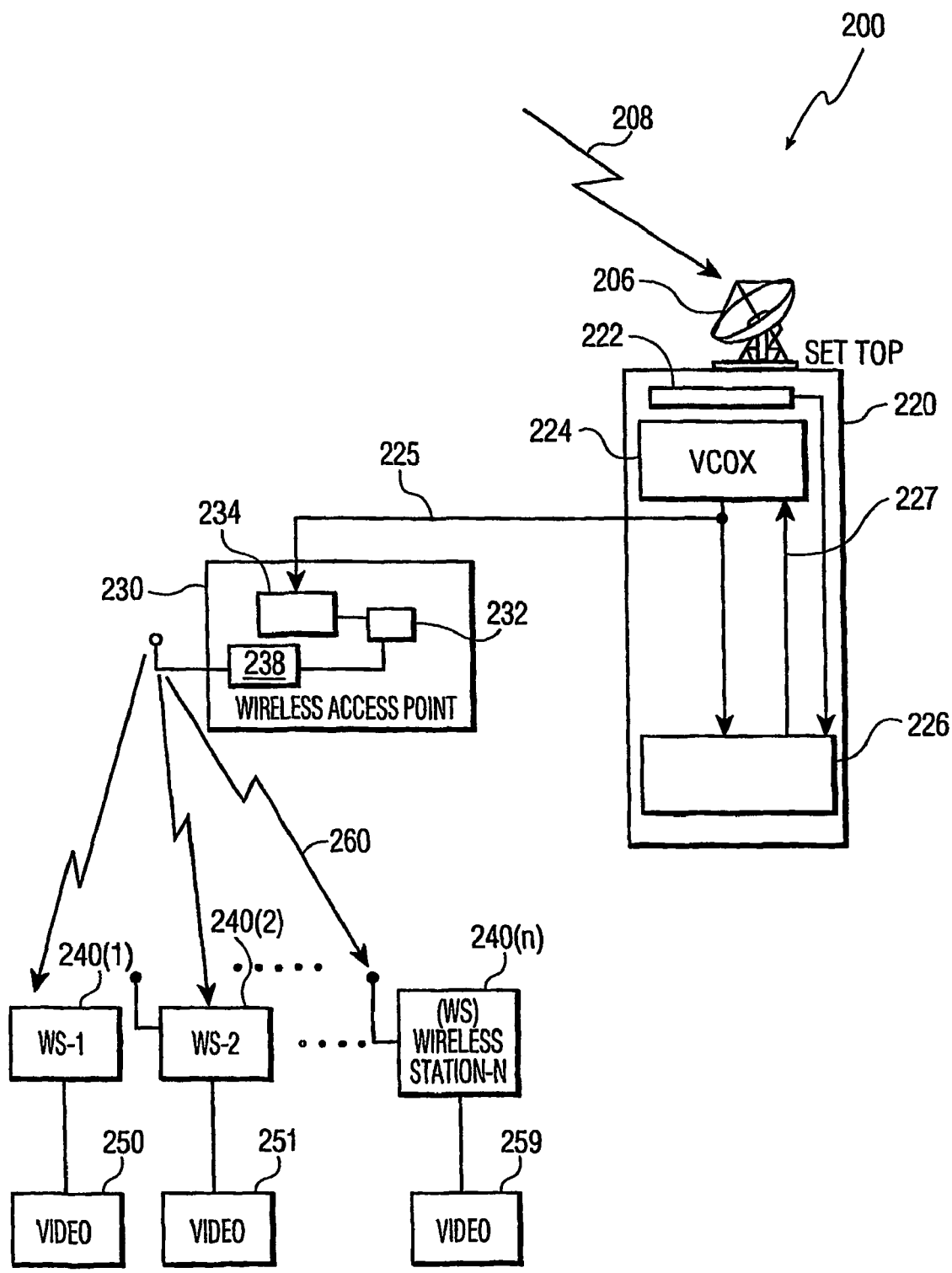
FIG. 2 is a block diagram of the invention for securing an adjusted time base.

Referring to FIG. 1 and FIG. 2 the invention disclosed herein includes one or more devices 220, 230 each comprising: a means for receiving a time stamp indicating the time of a video transmission; a means 224, 226 for determining a relative time difference between the time stamp 118 at time $t=t_0$ and a previous time stamp 118 at time $t=t_{-1}$; a means 224 for communicating the relative time difference to a transmitter 230 having as one feature of transmission a time base. The transmitter 230 includes means to adjust the received time base in according to the relative time difference. The transmitter 230 further communicates to one or more receivers 240(1), 240(2), through 240(n) the adjusted time base according to the relative time difference. Ultimately, the one or more receivers adjust each corresponding time base according to the relative time difference in order to synchronize the data rate with the transmitted program 208 transmission rate.

Referring to FIG. 2, the invention disclosed herein includes a receiver 220 comprising: a means for receiving a transmitted program 208; a means for receiving a transmitted time base 224, 226; a means for comparing the time difference between the current and last AUX packet's SCR to that of the current and last value latched in the local clock 224, a means to adjust the time base 225 and thereby synchronize the data rate with the transmitted program 208; and a means to communicate the adjusted time base 225 to a means 230 in order to synchronize the data rate with the transmitted program 208.

Referring again to FIG. 2, the invention disclosed herein includes a receiver 230 comprising: a means for receiving an adjusted time base 225 and thereby synchronizing the data rate with the transmitted program 208; and a means to communicate the adjusted time base 225 to one or more receiving a means 240(1), 240(2), through 240(n), in order to synchronize the data rate with the transmitted program 208.

Figure 3A:
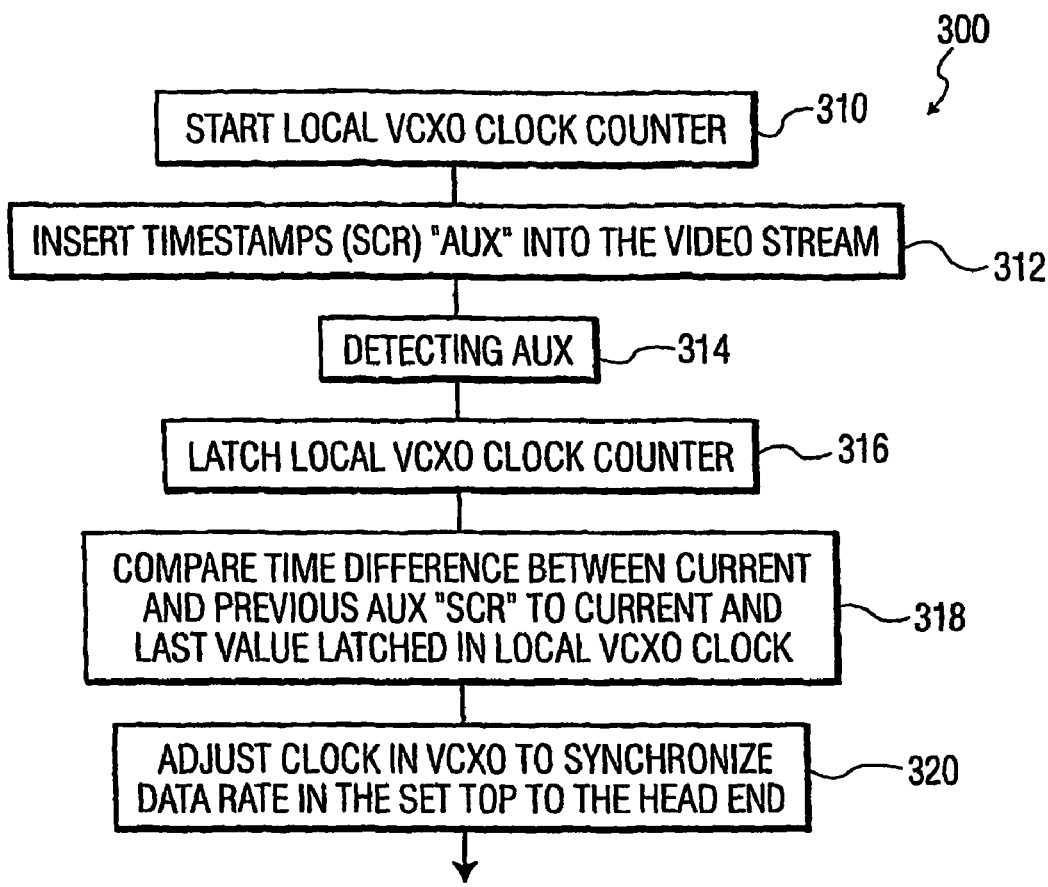
FIG. 3a and FIG. 3b is a flowchart showing the steps for securing an adjusted time base.

A method of the present invention is best understood with reference to FIG. 2 and FIG. 3a where—in the set top box 220 receives digital packets imbedded in the transmitted program 208 referred to as AUX that are periodically inserted 312 into the video stream. The local VCXO 224 counter having been previously started 310, is latched 316 at the exact time the AUX packet is detected 314 in the set top box 220. By comparing the time difference between the current and last AUX packet's SCR to that of the current and last value latched in the VCXO 224 local clock, adjustments to the VCXO 224 time base produces a signal 225 that synchronizes the transmitted program 208 transmission rates.

Figure 3B:
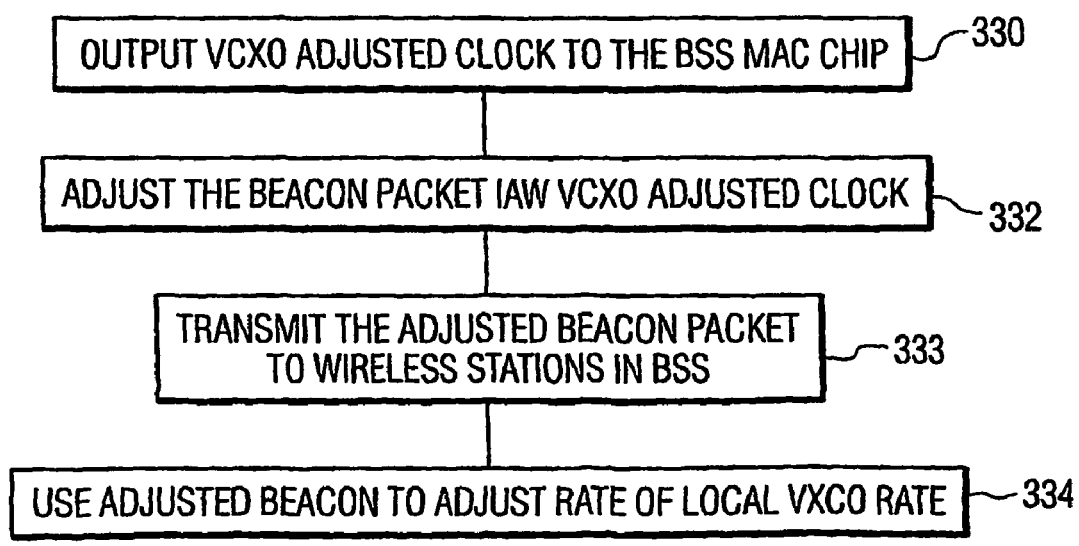

Referring to FIG. 3a and FIG. 3b the invention disclosed herein includes a method comprising the steps of: determining 318 a relative time difference between the time stamp and a previous time stamp; communicating 330 the relative time difference to a wireless access point transmitter having a time base as one feature of transmission; transmitting 333 the relative time difference to one or more wireless station receivers, wherein each of the one or more wireless station receivers adjusts the time base according to the relative time difference.

Referring again to FIG. 3a FIG. 3b the invention disclosed herein includes a method comprising the steps of: determining a relative time difference between the current and previous AUX SCR to the current and last value latched in the local VCXO clock 318; adjusting the clock in the VCXO to synchronize data rata in the set top to the head end 320; outputting the VCXO as adjusted, to the BSS MAC Chip 330; adjusting the beacon packet in accordance with the VCXO adjusted clock 332; transmitting the adjusted beacon packet to a wireless station in the BSS 333; and utilizing the adjusted beacon to adjust the rate of the local VCXO rate 334. Accordingly using this method, each of the one or more wireless station receivers adjusts the time base according to the relative time difference.

These changes in the rate of the wireless access point beacon and the affect upon the wireless station VCXO have a corresponding effect on the rate at which the video data is consumed and therefore reduce the risk of buffer underflow/overflow.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims. For example, although the invention is described in the context of IEEE 802.11 based WLANs, it is to be understood that the invention may be applied to structures based on other wireless LAN standards wherein the synchronization is to be maintained.

What is claimed is:

1. An apparatus for wirelessly transmitting and receiving digital video data, comprising:
   a means for receiving a time stamp indicating a time of a video transmission;
   a means for determining a relative time difference between the time stamp and a previous time stamp;
   a means for communicating the relative time difference to a transmitter having as one feature of transmission a time base;
   a means for the transmitter to adjust the time base according to the relative time difference, and wherein the transmitter communicates, to one or more, receivers, the adjusted time base according to the relative time difference.

2. The apparatus as defined in claim 1, wherein the one or more receivers adjust a time base according to the relative time difference.

3. A method of adjusting a time base according to a relative time difference comprising the steps of:
   determining a relative time difference between a time stamp and a previous time stamp;
   communicating the relative time difference to a transmitter having a time base as one feature of transmission;
   transmitting the relative time difference to one or more wireless station receivers, wherein each of the one or more wireless station receivers adjusts the time base according to the relative time difference.

4. The method as defined in claim 3, the method further comprising:
   determining a relative time difference between a current and a previous AUX SCR to the current and a last value latched in a local VCXO clock;
   adjusting a clock in the local VCXO to synchronize a data rate in a set top;
   outputting the adjusted VCXO clock to a MAC Chip;
   adjusting a beacon packet in accordance with the adjusted VCXO clock;
   transmitting the adjusted beacon packet to a wireless station receiver; and utilizing the adjusted beacon to adjust the rate of a local VCXO clock included in the wireless station receiver.

5. A wireless device, comprising:
a receiver receiving a time stamp indicating a time of a video transmission;
a processor determining a relative time difference between the time stamp and a previous time stamp and communicating the relative time difference to a transmitter having as one feature of transmission a time base;
wherein the transmitter adjusts the time base according to the relative time difference.

\* \* \* \* \*